United States Patent
Wang

(10) Patent No.: US 12,127,259 B2
(45) Date of Patent: Oct. 22, 2024

(54) COMMUNICATION METHOD AND APPARATUS

(71) Applicant: HUAWEI TECHNOLOGIES CO., LTD., Guangdong (CN)

(72) Inventor: Yi Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 521 days.

(21) Appl. No.: 17/401,547

(22) Filed: Aug. 13, 2021

(65) Prior Publication Data

US 2021/0378020 A1 Dec. 2, 2021

Related U.S. Application Data

(63) Continuation of application No. PCT/CN2020/074525, filed on Feb. 7, 2020.

(30) Foreign Application Priority Data

Feb. 15, 2019 (CN) .......................... 201910116762.0

(51) Int. Cl.
*H04W 74/0833* (2024.01)
*H04W 24/02* (2009.01)
(Continued)

(52) U.S. Cl.
CPC ....... *H04W 74/0833* (2013.01); *H04W 24/02* (2013.01); *H04W 24/08* (2013.01);
(Continued)

(58) Field of Classification Search
CPC . H04W 74/0833; H04W 24/02; H04W 24/08; H04W 24/10; H04W 74/008;
(Continued)

(56) References Cited

U.S. PATENT DOCUMENTS

| | | | | |
|---|---|---|---|---|
| 11,831,579 | B2* | 11/2023 | Rajagopal | ............. H04W 72/23 |
| 2018/0110074 | A1* | 4/2018 | Akkarakaran | ........ H04W 72/21 |

(Continued)

FOREIGN PATENT DOCUMENTS

| | | |
|---|---|---|
| CN | 104812084 A | 7/2015 |
| CN | 104883746 A | 9/2015 |

(Continued)

OTHER PUBLICATIONS

Office Action for Indian Patent Application No. 202117040965 dated Mar. 30, 2022, 6 pages.

(Continued)

*Primary Examiner* — Hardikkumar D Patel

(57) ABSTRACT

This technology of this application relates to a communication method and an apparatus. The method includes selecting, by user equipment (UE), a type of a random access message and determining one or more transmission opportunities based on one or more of a configuration message of a network device, a capability of the UE, and a preset rule set; and sending, by the UE, the random access message on one or more valid transmission opportunities in the one or more transmission opportunities. Types of random access messages include a first random access message and a second random access message, the first random access message includes a preamble sequence preamble and a physical uplink shared channel (PUSCH), and the second random access message includes a preamble but does not include a PUSCH.

20 Claims, 8 Drawing Sheets

(51) Int. Cl.
*H04W 24/08* (2009.01)
*H04W 24/10* (2009.01)
*H04W 74/00* (2009.01)
*H04W 74/08* (2009.01)

(52) U.S. Cl.
CPC ......... *H04W 24/10* (2013.01); *H04W 74/008* (2013.01); *H04W 74/0866* (2013.01)

(58) Field of Classification Search
CPC ........... H04W 74/0866; H04W 74/006; H04W 74/004; H04W 72/23; H04W 72/542; H04W 72/569; H04W 74/0875
See application file for complete search history.

(56) References Cited

U.S. PATENT DOCUMENTS

2019/0116599 A1* 4/2019 Xue ....................... H04L 5/0035
2022/0039171 A1* 2/2022 Ohara ................... H04W 72/04

FOREIGN PATENT DOCUMENTS

| CN | 108738087 A | 11/2018 |
|---|---|---|
| EP | 3331311 A1 | 6/2018 |
| KR | 20080018105 A | 2/2008 |

OTHER PUBLICATIONS

InterDigital Communications, 2-step random access procedure. 3GPP TSG RAN WGI AH_NR Meeting, Spokane, USA, Jan. 16-20, 2017, RI-1700703, 4 pages.

Nokia, Nokia Shanghai Bell, On 2-step Random Access Procedure. 3GPP TSG RAN WG1 Ad-Hoc Meeting 1901, Taipei, Taiwan, Jan. 21-25, 2019, R1-1901192, 8 pages.

Qualcomm Incorporated, DL based mobility UL channels. 3GPP TSG-RAN WG1 #86b, Sep. 10-14, 2016, Lisbon, Portugal, R1-1610169, 4 pages.

European Search Report dated Mar. 14, 2022 for Application No. 20756493.1, 10 pages.

Ericsson, NR two-step random access procedure. 3GPP TSG-RAN WG1 NR adhoc, Spokane, USA, Jan. 16-20, 2017, R1-1700300, total 4 pages.

3GPP TSG RAN WG2 Meeting #101, R2-1803093, Running Rel-15 36.321 CR for NB-IoT, Ericsson, Athens, Greece, Feb. 26-Mar. 2, 2018, total 13 pages.

3GPP TS 38.213 V15.4.0: "3rd Generation Partnership Project; Technical Specification Group Radio Access Network; NR; Physical layer procedures for control (Release 15)", Dec. 2018, total 104 pages.

3GPP TS 38.321 V15.4.0: "3rd Generation Partnership Project; Technical Specification Group Radio Access Network; NR; Medium Access Control (MAC) protocol specification (Release 15)", Dec. 2018, total 77 pages.

3GPP TSG RAN Meeting #82, RP-182894, New work item: 2-step RACH for NR, ZTE Corporation, Sanechips, Sorrento, Italy, Dec. 10-13, 2018, total 5 pages.

Office Action issued in CN 201910116762.0 dated Sep. 2, 2021, 7 pages.

International Search Report and Written Opinion issued in PCT/CN2020/074525, dated Apr. 28, 2020, 9 pages.

\* cited by examiner

S401. UE receives configuration information sent by a network device, where the configuration information includes one or more association parameters between downlink measurement and a transmission opportunity

S403. The UE selects one or more first transmission opportunities

S402. The UE selects a random access message based on the configuration information and a first preset rule

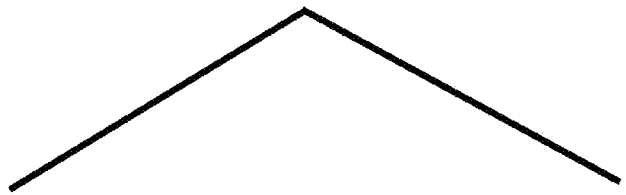

S4021. A transmission opportunity may be used for second-type random access (preamble only). If the UE selects this opportunity, the UE can send only an RACH S4022. A transmission opportunity may be used for first-type random access (preamble+PUSCH). If the UE selects this opportunity, the UE may send an RACH and a PUSCH

FIG. 4

S501. UE receives configuration information sent by a network device, where the configuration information includes one or more association parameters between downlink measurement and a transmission opportunity, and a preset rule includes comparisons between a measurement result and a downlink signal measurement threshold and between a to-be-sent payload and a configured value payload

S503. The UE selects one or more first transmission opportunities

S502. The UE selects a random access message based on the configuration information and a first preset rule

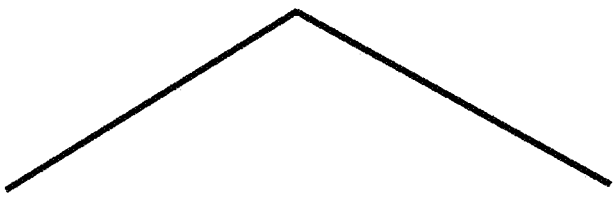

S5021. If preset rules are not satisfied at the same time, a transmission opportunity may be used for second-type random access (preamble only). If the UE selects this opportunity, the UE can send only an RACH S5022. If preset rules are satisfied at the same time, a transmission opportunity may be used for first-type random access (preamble+PUSCH). If the UE selects this opportunity, the UE may send an RACH and a PUSCH

FIG. 5

S601. UE receives configuration information sent by a network device, where the configuration information includes one or more association parameters between downlink measurement and a transmission opportunity, and a preset rule includes that a preset relationship includes a time relationship, in other words, whether first-type random access is faster than second-type random access

S603. The UE selects one or more first transmission opportunities

S602. The UE selects a random access message based on the configuration information and a first preset rule

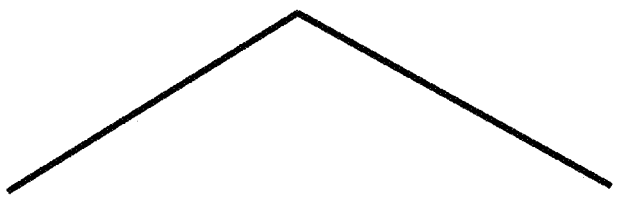

S6021. If preset rules are not satisfied at the same time, a transmission opportunity may be used for second-type random access (preamble only). If the UE selects this opportunity, the UE can send only an RACH S6022. If preset rules are satisfied at the same time, a transmission opportunity may be used for first-type random access (preamble+PUSCH). If the UE selects this opportunity, the UE may send an RACH and a PUSCH

FIG. 6

S701. UE receives configuration information sent by a network device, where the configuration information includes one or more association parameters between downlink measurement and a transmission opportunity

S703. The UE selects one or more first transmission opportunities

S702. The UE selects a random access message based on the configuration information and a first preset rule

S7021. If preset rules are not satisfied at the same time, a transmission opportunity may be used for second-type random access (preamble only). If the UE selects this opportunity, the UE can send only an RACH S7022. If preset rules are satisfied at the same time, a transmission opportunity may be used for first-type random access (preamble+PUSCH)

S704. The UE selects one or more second transmission opportunities based on the configuration information and a second preset rule, where the second preset rule includes whether a measurement gap position is considered, and/or whether another uplink signal is considered

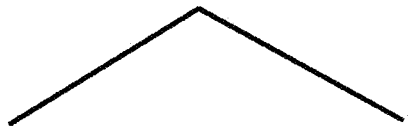

When the measurement gap position is not considered and/or whether another uplink signal is considered, if the UE selects this opportunity, the UE may transmit an RACH and a PUSCH When the measurement gap location is considered, and/or whether another uplink signal is considered, if the UE selects this opportunity, corresponding adjustment is performed with reference to the second preset rule

FIG. 7

COMMUNICATION METHOD AND APPARATUS

CROSS-REFERENCE TO RELATED APPLICATIONS

This application is a continuation of International Application No. PCT/CN2020/074525, filed Feb. 7, 2020, which claims priority to Chinese Patent Application No. 201910116762.0, filed on Feb. 15, 2019. The disclosures of the aforementioned applications are hereby incorporated by reference in their entireties.

TECHNICAL FIELD

This application relates to the field of communications technologies, and in particular, to a communication method and an apparatus.

BACKGROUND

That user equipment (UE) initiates contention-based random access usually includes four steps shown in FIG. 1. Message 1 (Msg1): A message 1 is sent by using a physical random access channel (PRACH), and carries a random access preamble. Message 2 (Msg2): A message 2 is scheduled by using a physical downlink control channel (PDCCH) and sent on a physical downlink shared channel (PDSCH). The message 2 indicates scheduling information such as a time-frequency resource that is used by the UE to send a message 3 (Msg3). Msg3: Initial transmission of Msg3 is performed on a physical uplink shared channel (PUSCH), and retransmission is performed on a PUSCH scheduled by using the PDCCH. Message 4 (Msg4): A message 4 is sent by using the PDSCH and generally contains a contention resolution identity which helps the UE set up an radio resource control (RRC) connection to a base station (BS) and enter an RRC_connected state. The foregoing four steps usually take a relatively long time. Therefore, new random access is needed to improve random access efficiency and ensure a random access success rate.

SUMMARY

This application provides a communication method, an apparatus, a chip, a program, a storage medium, and the like, to improve random access efficiency. The communication method may also be referred to as a transmission method, a random access method, a method, or the like.

In this application, UE flexibly determines a random access manner based on a configuration parameter sent by a network device, to minimize time consumed for random access. The UE may comprehensively consider a network status of a current network (a serving cell) and a network status of another network (or a neighboring cell) based on the configuration parameter sent by the network device. In addition, the network device may further change a detection manner, the configuration parameter, or the like, to improve detection efficiency of the network device, improve random access efficiency of the UE, and ensure a random access success rate.

According to a first aspect, a communication method is provided. The method includes: receiving, by user equipment, configuration information sent by a network device; and selecting, by the UE, a first random access message or a second random access message based on the configuration information and a first preset rule, where the first random access message includes a preamble sequence preamble and a physical uplink shared channel; and the second random access message includes a preamble but does not include a PUSCH.

In an implementation of the first aspect, after the receiving, by UE, configuration information sent by a network device, the method further includes: selecting, by the UE, one or more first transmission opportunities based on the configuration information, where the first transmission opportunity includes a first PRACH transmission opportunity and/or a first PUSCH transmission opportunity.

In an implementation of the first aspect, after the selecting, by the UE, one or more first transmission opportunities based on the configuration information, the method further includes: selecting, by the UE, one or more second transmission opportunities from the one or more first transmission opportunities based on the configuration information and a second preset rule, where the second transmission opportunity includes a second PRACH transmission opportunity and/or a second PUSCH transmission opportunity.

A second aspect provides an apparatus, where the apparatus includes a transceiver or a transceiver unit, configured to receive configuration information sent by a network device; and a processor or a processing unit, configured to select a first random access message or a second random access message based on the configuration information and a first preset rule, where the first random access message includes a preamble sequence preamble and a physical uplink shared channel; and the second random access message includes a preamble but does not include a PUSCH.

In an implementation of the second aspect, the processor or the processing unit is further configured to: select one or more first transmission opportunities based on the configuration information, where the first transmission opportunity includes a first PRACH transmission opportunity and/or a first PUSCH transmission opportunity.

In an implementation of the second aspect, the processor or the processing unit is further configured to: select one or more second transmission opportunities from the one or more first transmission opportunities based on the configuration information and a second preset rule, where the second transmission opportunity includes a second PRACH transmission opportunity and/or a second PUSCH transmission opportunity.

In an implementation of the first aspect or the second aspect, the configuration information includes one or more of the following information: an indication information indicator, a downlink signal measurement threshold, a configured PUSCH threshold payload, a time difference threshold, a measurement gap position, and one or more association parameters between a downlink signal and a transmission opportunity.

In an implementation of the first aspect or the second aspect, the first preset rule or the second preset rule includes one or more of the following: a relationship between a measurement result of a downlink signal and the downlink signal measurement threshold, a relationship between a to-be-sent PUSCH payload and a configured PUSCH payload, a time sequence of transmission opportunities, a relationship between a transmission opportunity and a measurement gap position, and a priority relationship between a transmission opportunity and another uplink signal.

In an implementation of the first aspect, the configuration information includes a first downlink signal measurement threshold, a second downlink signal measurement threshold, and the one or more association parameters between a downlink signal and a transmission opportunity, where the first downlink signal measurement threshold is less than the second downlink signal measurement threshold; and before the selecting, by the UE, a first random access message or a second random access message based on the configuration information and a first preset rule, the method further includes: obtaining, by the UE, a measurement result of one or more downlink signals.

In an implementation of the second aspect, the configuration information includes a first downlink signal measurement threshold, a second downlink signal measurement threshold, and the one or association parameters between a downlink signal and a transmission opportunity, where the first downlink signal measurement threshold is less than the second downlink signal measurement threshold; and the processor or the processing unit is further configured to obtain a measurement result of one or more downlink signals.

In an implementation of the first aspect or the second aspect, the first preset rule specifically includes: if a measurement result of at least one downlink signal is greater than or equal to the second downlink signal measurement threshold, the first random access message is selected; or if a measurement result of any downlink signal is less than the first downlink signal measurement threshold, the second random access message is selected.

In an implementation of the first aspect or the second aspect, the configuration information includes the time difference threshold and the one or more association parameters between a downlink signal and a transmission opportunity, where the one or more association parameters include an association parameter between the downlink signal and a first-type random access transmission opportunity, and an association parameter between the downlink signal and a second-type random access transmission opportunity, and in first-type random access, the first random access message is selected: or in second-type random access, the second random access message is selected.

In an implementation of the first aspect or the second aspect, the first preset rule includes:
if a difference between a reference moment corresponding to the first-type random access transmission opportunity associated with the downlink signal and a reference moment corresponding to the second-type random access transmission opportunity associated with the downlink signal is less than the time difference threshold, the first random access message is selected; or if a difference between a reference moment corresponding to the first-type random access transmission opportunity associated with the downlink signal and a reference moment corresponding to the second-type random access transmission opportunity associated with the downlink signal is greater than the time difference threshold, the second random access message is selected.

In an implementation of the first aspect or the second aspect, when the UE, the processor or the processing unit selects the first random access message, and the configuration information includes the measurement gap position, the second preset rule includes that the second transmission opportunity is selected not based on the measurement gap position.

In an implementation of the first aspect or the second aspect, when the UE, the processor or the processing unit selects the first random access message, and the configuration information includes the measurement gap position, the second preset rule includes: a conflict occurs between the first transmission opportunity and the measurement gap position, and the first transmission opportunity is not selected as the second transmission opportunity: or a transmission opportunity that is N time units behind the first transmission opportunity is selected as the second transmission opportunity, where the conflict includes that the first transmission opportunity and the measurement gap position at least partially overlap in time, or an interval is less than M time units, and M and N are greater than 0.

In an implementation of the first aspect or the second aspect, the second preset rule includes one or more of the following: a conflict occurs between the first transmission opportunity and another uplink transmission, and a transmission opportunity that is N time units behind the first transmission opportunity is selected as the second transmission opportunity; a conflict occurs between the first transmission opportunity and another uplink transmission, the first transmission opportunity is selected as the second transmission opportunity, and the another uplink transmission is not sent on the second transmission opportunity; a conflict occurs between the first PRACH transmission opportunity and another uplink transmission, and the first PRACH transmission opportunity is not selected as the second PRACH transmission opportunity: a conflict occurs between the first PUSCH transmission opportunity and another uplink transmission, and the first PUSCH transmission opportunity is not selected as the second PUSCH transmission opportunity; a conflict occurs between the first PUSCH transmission opportunity and another uplink transmission, the $1^{st}$ first PUSCH transmission opportunity is selected as the second PUSCH transmission opportunity, the another uplink transmission is not sent on the second PUSCH transmission opportunity, and a first PUSCH transmission opportunity except the $1^{st}$ first PUSCH transmission opportunity is not selected as the second PUSCH transmission opportunity; or a conflict occurs between at least a part of the first PUSCH transmission opportunity and another uplink transmission, a first part of the first PUSCH transmission opportunity does not conflict with another uplink transmission, a part that does not conflict with another uplink transmission and that is of the first PUSCH transmission opportunity is selected as the second PUSCH transmission opportunity, and only another uplink transmission is sent in a part that conflicts with the another uplink transmission and that is of the first PUSCH transmission opportunity, where the first part of the first PUSCH transmission opportunity may be a first time or frequency unit, a first time-frequency resource block, or a first transmission of a PUSCH that is repeatedly transmitted for a plurality of times; and the conflict includes that the first transmission opportunity and the measurement gap position at least partially overlap in time, or the interval is less than M time units, and M and N are greater than 0.

In an implementation of the first aspect or the second aspect, the method further includes: sending, by the UE, the second random access message to the network device on one first transmission opportunity or one second transmission opportunity; or sending, by the UE, the first random access message to the network device on the plurality of first transmission opportunities or the plurality of second transmission opportunities, where the plurality of first transmission opportunities or the plurality of second transmission opportunities include P first PRACH transmission opportunities and Q first PUSCH transmission opportunities, or P second PRACH transmission opportunities and Q second PUSCH transmission opportunities, and P and Q are positive integers greater than or equal to 1.

In an implementation of the second aspect, the transceiver or the transceiver unit is further configured to: send the second random access message to the network device on one first transmission opportunity or one second transmission opportunity; or send the first random access message to the network device on the plurality of first transmission opportunities or the plurality of second transmission opportunities, where the plurality of first transmission opportunities or the plurality of second transmission opportunities include P first PRACH transmission opportunities and Q first PUSCH transmission opportunities, or P second PRACH transmission opportunities and Q second PUSCH transmission opportunities, and P and Q are positive integers greater than or equal to 1.

In an implementation of the first aspect or the second aspect, P is 2, and/or Q is 4.

In an implementation of the first aspect or the second aspect, the P first PRACH transmission opportunities or the P second PRACH transmission opportunities are P PRACH transmission opportunities that are consecutive in frequency or time and that are associated with a same downlink signal; or the Q first PUSCH transmission opportunities or the Q second PUSCH transmission opportunities are determined based on one or more of the configured PUSCH payload, the measurement result of the downlink signal and an association relationship with a first PRACH transmission opportunity. It should be understood that the Q first PUSCH transmission opportunities or the Q second PUSCH transmission opportunities may be combined into a whole, and are Q parts of one transmission opportunity. Each part may be a time, a frequency, or a time-frequency resource block. This is not limited in this application.

In an implementation of the first aspect or the second aspect, the measurement result of the downlink signal is less than a first threshold, or the configured PUSCH threshold is greater than a second threshold, or is M time units and N frequency domain units offset to a reference position of the first PRACH transmission opportunity. If one or more of the foregoing conditions are met, then the Q first PUSCH transmission opportunities or the Q second PUSCH transmission opportunities are Q PUSCH transmission opportunities that are consecutive in frequency or time and that are associated with a same downlink signal. The time unit may be an orthogonal frequency division multiplexing (OFDM) symbol, a slot, a subframe, or the like. The frequency domain unit may be a subcarrier, a resource block, a resource block group, or the like. M or N may be a value directly configured by a network, or may be indirectly determined based on a multiplexing type that is of a PRACH and a PUSCH in time-frequency domain and that is configured by the network. As described above, the Q consecutive opportunities may be considered as one transmission opportunity, and are formed by Q parts.

According to a third aspect, a communication method is provided, where the method includes: sending, by a network device, configuration information to user equipment; and detecting, by the network device, a random access message sent by the UE, where the random access message is a first random access message or a second random access message, the first random access message includes a preamble sequence preamble and a physical uplink shared channel, and the second random access message includes a preamble but does not include a PUSCH; and the configuration information includes one or more of the following information: an indication information indicator, a configured PUSCH threshold payload, a time difference threshold, a measurement gap position, and one or more association parameters between a downlink signal and a transmission opportunity.

According to a fourth aspect, an apparatus is provided. The apparatus includes: a transceiver or transceiver unit, configured to send configuration information to user equipment, where the transceiver or the transceiver unit is further configured to detect a random access message sent by the UE; the random access message is a first random access message or a second random access message, the first random access message includes a preamble sequence preamble and a physical uplink shared channel, and the second random access message includes a preamble but does not include a PUSCH; and the configuration information includes one or more of the following information: an indication information indicator, a configured PUSCH threshold payload, a time difference threshold, a measurement gap position, and one or more association parameters between a downlink signal and a transmission opportunity.

In an implementation of the third aspect or the fourth aspect, the downlink signal measurement threshold includes a first downlink signal measurement threshold and a second downlink signal measurement threshold; or the one or more association parameters between a downlink signal and a transmission opportunity include an association parameter between the downlink signal and a first-type random access transmission opportunity, and an association parameter between the downlink signal and a second-type random access transmission opportunity; and in first-type random access, the UE sends the first random access message; or in second-type random access, the UE sends the second random access message.

In an implementation of the third aspect or the fourth aspect, a transmission opportunity indicated by the one or more association parameters between a downlink signal and a transmission opportunity does not conflict with another uplink transmission or the measurement gap position; or if a conflict occurs between the transmission opportunity indicated by the one or more association parameters between a downlink signal and a transmission opportunity and another uplink transmission or the measurement gap, a transmission opportunity that is N time units behind the transmission opportunity is selected as the transmission opportunity; and the transmission opportunity indicated by the one or more association parameters between a downlink signal and a transmission opportunity includes a PRACH transmission opportunity and a PUSCH transmission opportunity; the conflict includes that the transmission opportunity and the another uplink transmission at least partially overlap in time, or an interval is less than M time units; and M and N are greater than 0.

According to a fifth aspect, a computer-readable storage medium is provided. The computer-readable storage medium stores an instruction. When the instruction is run on a computer, the computer performs the methods in the foregoing aspects.

According to a sixth aspect, a computer program product including an instruction is provided. When the computer program product runs on a computer, the computer performs the methods in the foregoing aspects.

According to a seventh aspect, an apparatus is provided and is configured to perform the methods in the foregoing aspects.

According to an eighth aspect, an apparatus is provided, including a processor or a processing unit, where the processor or the processing unit is coupled to a memory; and the memory, configured to store a computer program. The processor or processing unit is configured to execute the computer program stored in the memory, so that the apparatus performs the methods in the foregoing aspects.

According to a ninth aspect, an apparatus is provided, including a processor or a processing unit, a memory, and a transceiver or a transceiver unit. The memory is configured to store a computer program; and the processor or the processing unit is configured to execute the computer program stored in the memory, so that the apparatus performs the methods in the foregoing aspects.

According to a tenth aspect, a processor, a processing unit, or a chip is provided. The processor, the processing unit, or the chip includes at least one circuit, and is configured to perform the methods in the foregoing aspects.

According to an eleventh aspect, a computer program is provided, including a program or an instruction. When the program or the instruction is run on a computer, the methods in the foregoing aspects are performed.

According to a twelfth aspect, a system is provided. The system includes the apparatus in the second aspect or the fourth aspect.

BRIEF DESCRIPTION OF DRAWINGS

To describe technical solutions in this application or in the background more clearly, the following describes the accompanying drawings used in describing this application or the background.

FIG. 4 is an example schematic flowchart of another method according to this application;

FIG. 5 is an example schematic flowchart of another method according to this application;

FIG. 6 is an example schematic flowchart of another method according to this application:

FIG. 7 is an example schematic flowchart of another method according to this application;

DESCRIPTION OF EMBODIMENTS

The following describes this application with reference to accompanying drawings in this application.

Figure 1:
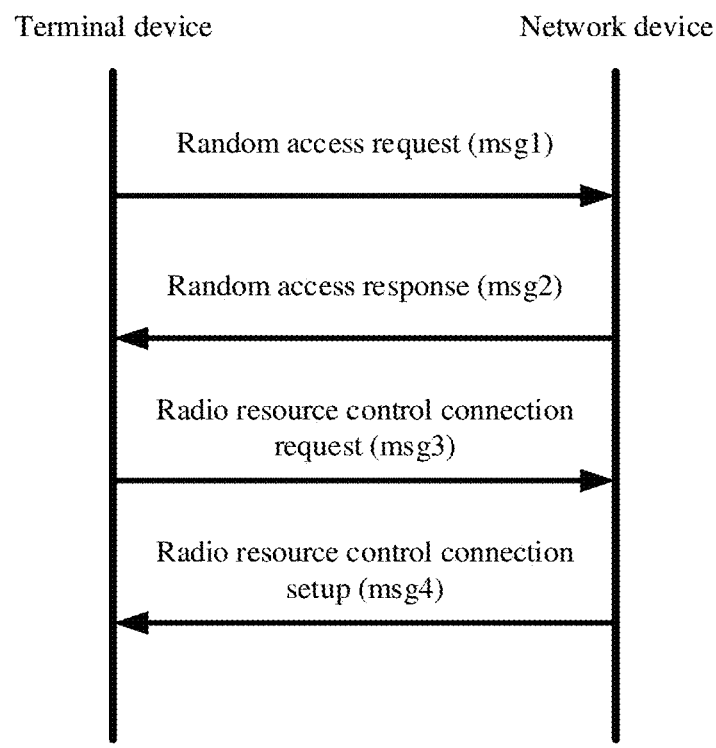
FIG. 1 is an example schematic flowchart of a random access procedure.
Figure 2:
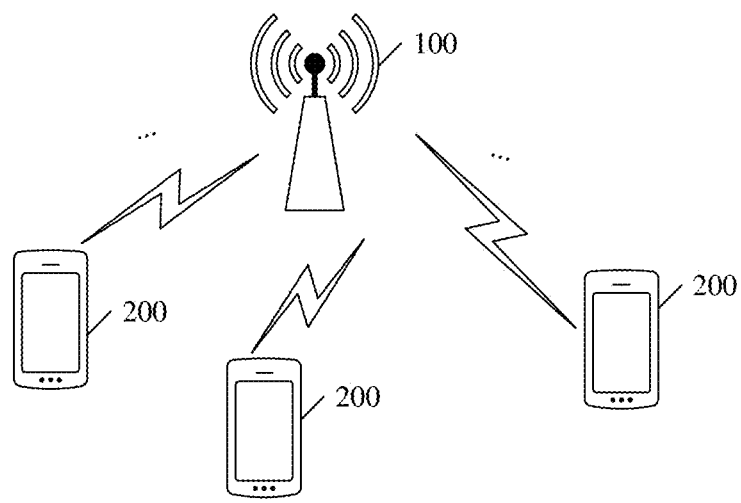
FIG. 2 is an example schematic diagram of a communications system according to this application.

FIG. 2 is a schematic diagram of a communications system according to this application. The communications system may include at least one network device 100 and one or more terminal devices 200 connected to the network device 100.

The network device 100 may be a device that can communicate with the terminal device 200. The network device 100 may be any device with a wireless transceiving function. The device includes but is not limited to: a base station (for example, a NodeB, an evolved NodeB (eNodeB), a gNodeB in a fifth generation (5G) communications system, a base station or network device in a future communications system, an access node in a Wi-Fi system, a wireless relay node, and a wireless backhaul node) and so on. Alternatively, the network device 100 may be a radio controller in a cloud radio access network (CRAN) scenario. The network device 100 may alternatively be a network device in a 5G network or a network device in a future evolved network, or may be a wearable device, a vehicle-mounted device, or the like. The network device 100 may alternatively be a small cell, a transmission node (TRP), or the like. Certainly, this application is not limited thereto.

The terminal device 200 is a device having a wireless transceiver function, and may be deployed on land, where the deployment includes indoor, outdoor, handheld, wearable, or vehicle-mounted deployment, may be deployed on water (for example, on a ship), or may be deployed in air (for example, on an aircraft, a balloon, and a satellite). The terminal device may be a mobile phone, a tablet computer, a computer having a wireless transceiver function, a virtual reality (VR) terminal device, an augmented reality (AR) terminal device, a wireless terminal in industrial control, a wireless terminal in self-driving, a wireless terminal in remote medical, a wireless terminal in a smart grid, a wireless terminal in transportation safety, a wireless terminal in a smart city, a wireless terminal in a smart home, or the like. An application scenario is not limited in the embodiments of this application. The terminal device sometimes may also be referred to as user equipment, an access terminal device, a UE unit, a UE station, a mobile station, a mobile station, a remote station, a remote terminal device, a mobile device, a UE terminal device, a terminal device, a terminal, a wireless communication device, a UE agent, a UE apparatus, or the like.

It should be noted that, terms "system" and "network" in this application may be used interchangeably. "A plurality of" means two or more. In view of this, "a plurality of" may also be understood as "at least two" in this application. The term "and/or" describes an association relationship between associated objects and represents that three relationships may exist. For example, A and/or B may represent the following three cases: Only A exists, both A and B exist, and only B exists. In addition, unless otherwise specified, the character "/" generally indicates an "or" relationship between the associated objects. In addition, to clearly describe the technical solutions in the embodiments of this application, terms such as "first" and "second" are used in the embodiments of this application to distinguish between same items or similar items with basically same functions or purposes. A person skilled in the art may understand that the words such as "first" and "second" do not limit a quantity or an execution sequence, and the words such as "first" and "second" do not mean being definitely different either. It should also be understood that in this application (except the background), a random access message may be a first random access message and/or a second random access message if mentioned. If a preset rule is mentioned, the preset rule may be a first preset rule and/or a second preset rule. If a transmission opportunity is mentioned, the transmission opportunity may be a first transmission opportunity and/or a second transmission opportunity. If a PRACH is mentioned, the PRACH may be of first-type random access and/or second-type random access.

Figure 3:
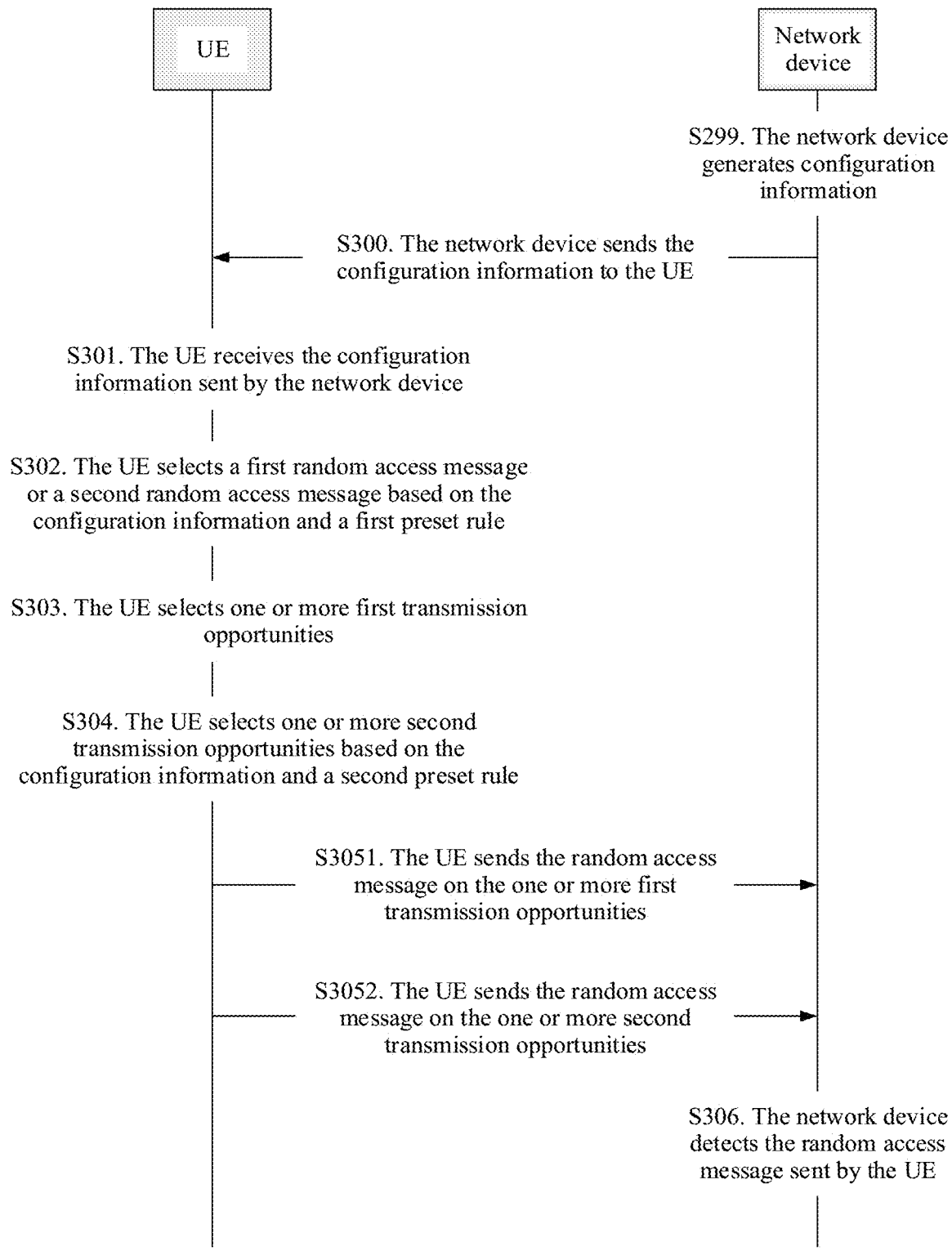
FIG. 3 is an example schematic interaction flowchart of a communication method according to this application.

FIG. 3 is a schematic interaction flowchart of a communication method according to an embodiment of this application. The method may include the following steps.

(Optional) S300. A network device sends configuration information to UE.

The network device may send the configuration information to the UE by using one or more pieces of downlink indication information or one or more channels. The downlink indication information may be a system message, a PRACH configuration, a cell handover command, or RRC higher layer signaling.

Optionally, before S300, the method may further include S299: The network device generates the configuration information. The network device may generate the configuration information based on one or more conditions such as a current network status and a capability of the network device. For example, one or more association parameters between a downlink signal and a transmission opportunity may be adjusted based on a measurement gap position; or one or more association parameters between a downlink signal and a transmission opportunity may be adjusted based on an uplink-downlink configuration, to reduce conflicts. More information may be further added to the configuration information, to help the UE complete random access, thereby improving random access efficiency and a random access success rate.

S301. The UE receives the configuration information sent by the network device.

The configuration information includes one or more of an indication information indicator, a downlink signal measurement threshold, a configured PUSCH threshold payload, a time difference threshold, a measurement gap position, and one or more association parameters between a downlink signal and a transmission opportunity. It should be understood that the configuration information may further include any other information that is useful for random access of the UE. This is not limited in this application. It should also be understood that the one or more pieces of information may be preconfigured, for example, pre-stored in the UE and the network device. In this case, the network device does not need to send the one or more pieces of information.

The indication information indicator (or referred to as control indication information) is used to adjust a preset relationship. For example, the indication information may be a switch control function, and is used to indicate whether first-type random access is supported in current configuration information. The indication information may also be used to indicate whether the "preset relationship" takes effect. Different indication values correspond to different preset relationships, and therefore correspond to different UE processing actions. The indication information may also be used to indicate whether there are different mapping relationships between a transmission opportunity and a downlink signal. The indication information may also be used to indicate whether UE can simultaneously initiate a plurality of random access procedures. For example, the UE may select a first random access message based on the indicator, send the first random access message to the network device; before a corresponding random access response is received, or before first-type random access is completed and second-type random access is switched to, the UE further selects a second random access message, and sends the second random access message to the network device. The one or more association parameters include an association parameter between the downlink signal and a first-type random access transmission opportunity, and an association parameter between the downlink signal and a second-type random access transmission opportunity. In this case, for first-type random access and second-type random access, transmission opportunities may be obtained by using different association parameters, and the network device may determine, based on a transmission opportunity that a random access message is sent on, a type of the random access message that the UE sends. The one or more association parameters may also include an association parameter of a PRACH transmission opportunity. In this case, the first-type random access and the second-type random access share a transmission opportunity corresponding to the association parameter. In the first-type random access, the UE selects the first random access message; or in the second-type random access, the UE selects the second random access message.

One type of one or more association parameters may include an association parameter of a PRACH, and may further include an association parameter of a PUSCH. Alternatively, only an association parameter of a PRACH may be included, and an association parameter of a PUSCH may be determined based on the PRACH.

S302. The UE selects the first random access message or the second random access message based on the configuration information and a first preset rule, where the first random access message includes a preamble sequence preamble and a PUSCH; and the second random access message includes a preamble but does not include a PUSCH. It should be understood that the random access message may further include other information than the preamble and the PUSCH. This is not limited in this application.

The preset rule may also be referred to as a preset relationship. The preset rule may be stored in the UE and/or the network device, or may be sent by one party that does not store the preset rule to the other party. The preset rule includes one or more of the following: a relationship between a measurement result of a downlink signal and the downlink signal measurement threshold, a relationship between a to-be-sent PUSCH payload and the configured PUSCH payload, a time sequence of transmission opportunities, a relationship between a transmission opportunity and a measurement gap position, and a priority relationship between a transmission opportunity and another uplink signal. In step S302, a capability of the UE itself further needs to be considered, for example, whether the UE can send the first random access message (e.g., whether the UE supports the first-type random access).

According to the foregoing method, when the UE can send the first random access message, the UE may choose to send the first random access message or the second random access message based on a current network status, thereby improving the random access efficiency. Because steps of the random access can be reduced by sending the first random access message, the random access efficiency is improved.

Optionally, after S301, the method further includes S303: The UE selects one or more first transmission opportunities (based on, for example, the one or more association parameters between a downlink signal and a transmission opportunity that are in the configuration information). The first transmission opportunity is a transmission opportunity on which the random access message may be sent. The first transmission opportunity includes a first PRACH transmission opportunity and/or a first PUSCH transmission opportunity. The first PRACH transmission opportunity is used to transmit the preamble and/or other information, and the first PUSCH transmission opportunity is used to transmit the PUSCH and/or other information. The UE generally finds a corresponding PUSCH transmission opportunity based on the PRACH transmission opportunity. A transmission opportunity is a transmission resource, or referred to as a time-frequency resource, or may be referred to as a transmission position. The time-frequency resource includes a time domain position (for example, a slot or slots) and a frequency domain position (for example, a resource block (RB) or RBs). The one or more first transmission opportunities may form a set, and the UE may select, from the set, a transmission opportunity for actually sending the random access message. Therefore, optionally, the method may further include S3051: The UE sends the random access message on the one or more first transmission opportunities. Certainly, the random access message may not be sent on the first transmission opportunity, and a transmission opportunity for actually sending the random access message is further selected based on another condition. Optionally, the capability of the UE and a first preset relationship may also be considered when the first transmission opportunity is selected. It should be understood that a time sequence of S302 and S303 is not limited in this application. S302 may be performed before, after, or simultaneously with S303, or S303 may not exist.

Optionally, after S301, the method further includes S304: The UE selects one or more second transmission opportunities based on the configuration information and a second preset rule. The one or more second transmission opportunities are used to send the first random access message or the second random access message. The second transmission opportunity includes a second PRACH transmission opportunity and/or a second PUSCH transmission opportunity. The second PRACH transmission opportunity is used to transmit the preamble and/or other information, and the second PUSCH transmission opportunity is used to transmit the PUSCH and/or other information. After the UE selects the first transmission opportunity (or there may not be the step in which the UE selects the first transmission opportunity), the UE may determine, based on a current conflict status and another condition, for example, whether there is a conflict with another uplink transmission signal and/or the measurement gap position, whether the first transmission opportunity can be actually used to send the random access message (or directly determine whether a transmission opportunity can be used to send the random access message), or perform corresponding processing on the first transmission opportunity or another uplink transmission signal to actually send the random access message. Therefore, optionally, the method may further include S3052: The UE sends the random access message on the one or more second transmission opportunities. It should be understood that a time sequence between S304 and S303 is not limited in this application, and S303 and/or S304 may not exist in this application.

Optionally, the method further includes S306: The network device detects the random access message sent by the UE. S306 specifically includes: The network device detects a PRACH of the random access message on one or more beam directions of a downlink signal associated with a transmission opportunity and a PRACH transmission opportunity; and the network device detects or attempts to detect, based on the detected PRACH transmission opportunity and a mapping relationship between the PRACH transmission opportunity and a PUSCH transmission opportunity, a PUSCH on one or more corresponding PUSCH transmission opportunities.

Generally, a difference between detection and a detection attempt lies in whether the network device can determine whether the UE performs the first-type random access or the second-type random access. When the network device can determine that the UE performs the first-type random access, the network device performs detection. When the network device can determine that the UE performs the second-type random access, the network device does not detect a PUSCH. When the network device cannot determine a type of PRACH process that is performed by the UE, the network device attempts to detect a PUSCH.

The network device determines the type of PRACH that is performed by the UE based on one or more of the indication information, the detected PRACH transmission opportunity, or a preamble format.

Optionally, the method further includes S307: The network device performs hybrid automatic repeat request (HARQ) combination on a plurality of detected PUSCHs.

Optionally, before S302, the method further includes: The UE obtains a measurement result Mrsrp of one or more downlink signals.

The downlink signal may be any downlink signal, for example, an synchronization signal block (SSB) or a channel state information reference signal (CSI-RS). The UE may measure downlink signals sent by the network device on a plurality of beams, to obtain measurement results of the downlink signals, for example, measuring of synchronization signal reference signal received power (SS-RSRP) of an SSB or reference signal reference signal received power (RS-RSRP) of a CSI-RS, to find a beam suitable for sending the random access message. The downlink signal measurement threshold may be compared with the measurement results of the downlink signals, to determine whether a transmission opportunity corresponding to a downlink signal may be used to send the first random access message or send the second random access message.

Referring to FIG. 4, when the configuration information includes a first downlink signal measurement threshold T1, a second downlink signal measurement threshold T2, and the one or more association parameters between a downlink signal and a transmission opportunity, where the first downlink signal measurement threshold is less than the second downlink signal measurement threshold, and when the UE supports the first-type random access, the first preset rule includes: If a measurement result of at least one downlink signal is greater than the second downlink signal measurement threshold, the UE may select the first random access message; or if a measurement result of any downlink signal is less than the first downlink signal measurement threshold, the UE may select the second random access message. It should be understood that the first preset rule may also be expressed as follows: If a measurement result of any downlink signal meets $T1 \leq Mrsrp < T2$, a transmission opportunity associated with the downlink signal may be used for the second-type random access; if a measurement result of any downlink signal meets $T2 <= Mrsrp$, a transmission opportunity associated with the downlink signal may be used for the first-type random access; or if no measurement result meets the foregoing conditions, the UE may select a transmission opportunity associated with any downlink signal, and can only perform the second-type random access.

Optionally, if the configuration information includes indication information, a preset relationship may be as follows: If the indication information is a first value (for example, Indicator=1), it may indicate that a quantity of current active users is not large, and the network may allocate different PRACH resources (transmission opportunities) to the first-type random access and the second-type random access, to help reduce random access resource sharing, a probability of conflict, and a blind detection probability of the network device. In this case, the first preset rule may remain unchanged. If the indication information is a second value (for example, Indicator=0), it may indicate that currently a quantity of possible random access users is relatively large, a random access capacity is limited, the first-type random access and the second-type random access need to share the transmission opportunity, and the network device may further identify, in another manner, a random result process initiated by the UE. In this case, the first preset rule may be expressed as follows: if a measurement result of any downlink signal meets T1≤Mrsrp<T2, a RACH resource associated with the downlink signal may be used for the second-type random access; if a measurement result of any downlink signal meets T2<=Mrsrp, the UE further needs to determine, by using another method, whether to initiate the first-type random access; or if no measurement result meets the foregoing conditions, the UE may select any downlink signal, and can perform only the second-type random access.

In the foregoing method, when downlink signal measurement quality is relatively good, the first random access message may be selected and sent if possible, to improve random access efficiency; and when downlink signal measurement quality is poor, the second random access message may be selected and sent, to improve an access success rate.

Referring to FIG. 5, when the configuration message includes the downlink signal measurement threshold T1, the configured PUSCH payload threshold, and the one or more association parameters between a downlink signal and a transmission opportunity, and the UE supports the first-type random access, the first preset rule specifically includes: if a measurement result of any downlink signal meets T1<=Mrsrp, a transmission opportunity associated with the downlink signal may be used for the first-type random access or second-type random access (the UE may select a first-type random access message or a second-type random access message). In this case, if a PUSCH payload that is to be transmitted by the UE is less than or equal to the configured PUSCH payload, the UE selects, for the first-type random access, a transmission opportunity associated with a downlink signal that meets both conditions of the downlink measurement threshold and the PUSCH payload threshold (or in other words, the UE selects the first-type random access message). If a PUSCH payload that is to be transmitted by the UE is greater than the configured PUSCH payload, the UE selects, for the second-type random access, a transmission opportunity associated with a downlink signal that meets the condition of the downlink measurement threshold (in other words, the UE selects the second-type random access message). If a measurement result of any downlink signal meets T1>Mrsrp, the UE may select a transmission opportunity associated with any downlink signal, and can perform only the second-type random access (in other words, the UE selects the second-type random access message).

Optionally, the configuration message may further include indication information. If the indication information is a first value (for example, Indicator=1), it may indicate that the network device supports the first-type random access. In this case, the first preset rule is consistent with the foregoing rule. If the indication information is a second value (for example, Indicator=0), it may indicate that the network device does not support the first-type random access. In this case, the UE can use only the second-type random access, and can select only the second random access message.

It should be understood that the configured PUSCH payload is used to describe a size of data information (for example, a transport block transportblock) carried on a PUSCH. Because transmitted data information is related to a PUSCH resource size and a code rate (for example, a modulation and coding scheme (MCS)), equivalently, in actual network configuration, a PUSCH resource block size or an MCS size may be further used to describe the configured PUSCH payload. In addition, to reduce overheads of network configuration information, a description of the PUSCH payload may be further configured based on a level. For example, a PUSCH payload corresponding to level 0 is not greater than 56 bits, and a PUSCH payload corresponding to level 1 is not greater than 72 bits.

In the foregoing method, the network device may reserve a PUSCH resource (a transmission opportunity) in advance based on whether the network device supports the first-type random access, a current quantity of active users, or the like, and prepare for blind detection in advance. Transmission opportunities of different PRACH processes may overlap, to increase a random access capacity. The foregoing method is applicable to a cell with good signal quality and a large number of active users.

Referring to FIG. 6, when the configuration information includes the time difference threshold and the one or more association parameters between a downlink signal and a transmission opportunity, where the one or more association parameters include the association parameter between the downlink signal and the first-type random access transmission opportunity, and the association parameter between the downlink signal and the second-type random access transmission opportunity, and when the UE supports the first-type random access, the first preset rule includes: If a difference between a reference moment corresponding to the first-type random access transmission opportunity associated with the downlink signal and a reference moment corresponding to the second-type random access transmission opportunity associated with the downlink signal is less than or equal to the time difference threshold, the UE selects the first random access message (or it may be understood as that if a time difference between a reference moment corresponding to the first-type random access transmission opportunity and a reference moment corresponding to the second-type random access transmission opportunity is greater than or equal to the time difference threshold, the first random access message is selected); or if a difference between a reference moment corresponding to a first-type random access channel (RACH) transmission opportunity associated with the downlink signal and a reference moment corresponding to the second-type random access transmission opportunity associated with the downlink signal is greater than the time difference threshold, the UE selects the second random access message (or it may be understood as that if a time difference between a reference moment corresponding to the first-type random access transmission opportunity and a reference moment corresponding to the second-type random access transmission opportunity is less than the time difference threshold, the second random access message is selected).

Specifically, the first preset rule may also be expressed as follows: If a time sequence (X1–X2) between a reference time point X1 corresponding to the first-type random access transmission opportunity and a reference time point X2 corresponding to the second-type random access transmission opportunity is greater than the time difference threshold, the UE determines that only the second-type random access can be used (the UE selects the second-type random access message); or if (X1–X2) is less than or equal to the time difference threshold, the UE may select the first-type random access. The reference time point is a reference position selected for comparison, and may be a start symbol or an end symbol of a transmission opportunity, a preamble start or end symbol of a random access message, a start symbol or an end symbol of a payload part of a random access message, a start symbol or an end symbol of a random access response corresponding to the second random access message, a start symbol or an end symbol of a response message (for example, a contention resolution message) sent by a base station corresponding to the first random access message, another specific position, or the like.

Optionally, if the configuration information includes the indication information, the UE may determine, based on the indication information, whether the first preset rule needs to be adjusted.

According to the foregoing method, the UE can select, based on possible time for completing random access, random access with a lower delay. There may be a time sequence between the second-type random access transmission opportunity and the first-type random access transmission opportunity that correspond to the downlink signal. When the second-type random access transmission opportunity is much earlier than the first-type random access transmission opportunity, even if the UE performs the first-type random access, an access delay is still not reduced, and access efficiency is still not improved, then the UE may select the second-type random access to improve the access efficiency, avoid unnecessary PUSCH resource waste, and reduce UE power consumption and complexity of blind detection performed by the network device.

Referring to FIG. 7, optionally, in S304, when the UE selects the first random access message, and the configuration information includes the measurement gap position, the second preset rule includes that the second transmission opportunity is selected by the UE not based on the measurement gap position. The measurement gap position is not considered when the first random access message is sent, so that the first-type random access can be initiated in time, thereby minimizing a delay.

Optionally, in S304, if the UE selects the first random access message, and the configuration information includes the measurement gap position, the second preset rule includes: A conflict occurs between the first transmission opportunity and the measurement gap position, and the UE does not select the first transmission opportunity as the second transmission opportunity; or a transmission opportunity that is N time units behind a reference moment of the first transmission opportunity (for example, a start symbol or an end symbol of the first PRACH transmission opportunity or a start symbol or an end symbol of the first PUSCH transmission opportunity) is selected as the second transmission opportunity, where the conflict includes that the first transmission opportunity and the measurement gap position at least partially overlap in time, or an interval is less than M time units, and M and N are positive integers greater than or equal to 0.

That the UE does not select the first transmission opportunity as the second transmission opportunity may also be referred to as that the UE actively discards the first transmission opportunity, or the UE does not expect that another uplink transmission is scheduled on the first transmission opportunity simultaneously. The measurement gap position is considered when the first random access message is sent, so that a signal quality of a target cell can be obtained in time, thereby maximizing a success rate of behavior such as a handover of a potential cell. The time unit may be a symbol, a slot, a mini-slot, a frame, a subframe, a half-frame, or the like. This is not limited in this application.

Optionally, the network device may actively discard or move backward a conflicted transmission opportunity based on the measurement gap position. The network device may adjust the one or more association parameters between a downlink signal and a transmission opportunity to resolve the conflict with the measurement gap position.

According to the foregoing method, the network device flexibly controls, based on a status of a network environment of the network device, for example, a quantity of active users, a resource, and a capacity, whether the UE considers the measurement gap position when sending a random access message. In addition, the UE may select, based on the capability of the UE itself and a current network status, whether to consider the measurement gap position. In addition, in the foregoing method, indication information may be further added to indicate whether the measurement gap position is considered. It should be understood that in this application, the foregoing consideration may alternatively be another network status other than the measurement gap position.

Referring to FIG. 7, optionally, in S304, the second preset rule may further include: A conflict occurs between the first transmission opportunity and another uplink transmission, and a transmission opportunity that is N time units behind the first transmission opportunity is selected as the second transmission opportunity; a conflict occurs between the first transmission opportunity and another uplink transmission, the first transmission opportunity is selected as the second transmission opportunity, and the another uplink transmission is not sent on the second transmission opportunity; a conflict occurs between the first PRACH transmission opportunity and another uplink transmission, and the first PRACH transmission opportunity is not selected as the second PRACH transmission opportunity; a conflict occurs between the first PUSCH transmission opportunity and another uplink transmission, and the first PUSCH transmission opportunity is not selected as the second PUSCH transmission opportunity; a conflict occurs between the first PUSCH transmission opportunity and another uplink transmission, the $1^{st}$ first PUSCH transmission opportunity is selected as the second PUSCH transmission opportunity, the another uplink transmission is not sent on the second PUSCH transmission opportunity, and a first PUSCH transmission opportunity except the $1^{st}$ first PUSCH transmission opportunity is not selected as the second PUSCH transmission opportunity; or a conflict occurs between at least a part of the first PUSCH transmission opportunity and another uplink transmission, a first part of the first PUSCH transmission opportunity does not conflict with another uplink transmission, a part that does not conflict with another uplink transmission and that is of the first PUSCH transmission opportunity is selected as the second PUSCH transmission opportunity, and only another uplink transmission is sent in a part that conflicts with the another uplink transmission and that is of the first PUSCH transmission opportunity, where the first part of the first PUSCH transmission opportunity may be a first time or frequency unit, a first time-frequency resource block, or a first transmission of a PUSCH that is repeatedly transmitted for a plurality of times; and the conflict includes that the first transmission opportunity and the measurement gap position at least partially overlap in time, or the interval is less than M time units, and M and N are greater than 0. The first transmission opportunity includes the first PRACH transmission opportunity and the first PUSCH transmission opportunity, and the second transmission opportunity includes the second PRACH transmission opportunity and the second PUSCH transmission opportunity. In the foregoing process, the UE may select the first random access message.

It should be understood that the second preset rule may also be expressed as follows: (1) When any part (for example, a preamble or a PUSCH) of the first random access message and another uplink transmission (for example, a PUSCH/physical uplink control channel (PUCCH)/sounding reference signal (SRS)) of the UE at least partially overlap in time, or an interval between any part of the first random access message and another uplink transmission is less than N time units (symbols), the UE does not send the first random access message, (2) when a PRACH part of the first random access message and another uplink transmission at least partially overlap in time, or an interval between a PRACH part and another uplink transmission is less than N time units (for example, symbols), the UE does not send the first random access message on a current opportunity until a next transmission opportunity that meets the second preset rule is determined; (3) when a PUSCH part of the first random access message and another uplink transmission at least partially overlap in time, or an interval between a PUSCH part and another uplink transmission is less than N time units (for example, symbols), the UE does not send the PUSCH part of the random access message, or adjusts a transmission position of the PUSCH backward by Y time units (for example, symbols or subframes) in time; or (4) when a PUSCH part of the random access message and another uplink transmission at least partially overlap in time, or an interval between a PUSCH part and another uplink transmission is less than N time units (symbols), the UE skips a current random access message transmission opportunity, selects a next random access message transmission opportunity, and repeatedly checks the second preset rule, until a transmission opportunity that satisfies the second preset rule is determined.

Optionally, a priority of a general random access message and other uplink transmission is as follows: For a random access message and a PUSCH/PUCCH, the UE does not send the random access message; for a random access message and an SRS, the UE does not send the SRS.

Optionally, the first transmission opportunity and transmission of another uplink channel or signal are known to the network device to some extent. Therefore, in another implementation, when the second transmission opportunity is determined, the UE does not perform additional determining, and the network device may perform scheduling to avoid a similar case, for example, adjust the one or more association parameters between a downlink signal and a transmission opportunity, or schedule another uplink transmission to avoid a conflict with any random access transmission opportunity. However, this inevitably brings a scheduling limitation to some extent. The scheduling limitation should also be explicitly embodied in a form of a preset rule in a specification, and become one of steps for determining the second transmission opportunity. For example, the UE does not expect the random access message to satisfy a relationship with another PUSCH/PUCCH/SRS in terms of time, which means that this case should be avoided by the network device through scheduling.

The foregoing method provides a method for performing random access when there is a conflict with uplink transmission and improves a random access success rate.

Optionally, in S299, when the one or more association parameters between a downlink signal and a transmission opportunity are generated, specifically, when an association parameter between a downlink signal and a PRACH transmission opportunity is generated, the network device and/or the UE determine, based on the association parameter and a first mapping rule that is between a downlink signal and a PRACH transmission opportunity and that is in the first preset rule, that a PRACH transmission opportunity mapped to any downlink signal is a transmission opportunity of the second random access message; and the network device and/or the UE determine, based on a second mapping rule that is between a downlink signal and a PRACH transmission opportunity and that is in the second preset rule, a PRACH transmission opportunity that is not mapped to any downlink signal as a transmission opportunity for sending the first random access message.

Optionally, in S306, the network device determines the beam direction corresponding to the PRACH transmission opportunity, detects a PRACH on the PRACH transmission opportunity and the beam direction, and detects a PUSCH on one or more first PUSCH transmission opportunities based on a detected preamble format of the PRACH and/or the PRACH transmission opportunity and a correspondence between the PRACH transmission opportunity and the PUSCH transmission opportunity.

Optionally, the configuration information includes an association parameter between a first downlink signal and a transmission opportunity and an association parameter between a second downlink signal and a transmission opportunity (specifically, an association parameter between a first downlink signal and a PRACH transmission opportunity and an association parameter between a second downlink signal and a PRACH transmission opportunity), and the UE supports the first-type random access. S302 may include: The UE selects the first random access message or the second random access message based on the association parameter between a first downlink signal and a PRACH transmission opportunity and the association parameter between a second downlink signal and a PRACH transmission opportunity. If the first-type random access is associated with the association parameter between a first downlink signal and a PRACH transmission opportunity, and the second-type random access is associated with the association parameter between a second downlink signal and a PRACH transmission opportunity, the first preset rule may include: Only the first-type random access can be performed on a transmission opportunity that is selected based on the association parameter between a first downlink signal and a PRACH transmission opportunity; and only the second-type random access can be performed on a transmission opportunity that is selected based on the association parameter between a second downlink signal and a PRACH transmission opportunity. The configuration information may further include a first downlink signal measurement threshold and a second downlink signal measurement threshold. If a measurement result of any downlink signal corresponding to the association parameter between a first downlink signal and a PRACH transmission opportunity is greater than or equal to the first downlink signal measurement threshold, the UE may select a transmission opportunity corresponding to a downlink signal that meets that a measurement result of the downlink signal is greater than or equal to the first downlink signal measurement threshold, to perform the first-type random access: or if a measurement result of any downlink signal corresponding to the association parameter between a first downlink signal and a PRACH transmission opportunity is less than the first downlink signal measurement threshold, the UE may select a PRACH transmission opportunity corresponding to any downlink signal to perform the first-type random access.

In the foregoing method, the first-type random access and the second-type random access use different PRACH transmission opportunities, thereby minimizing impact on existing random access and capacity.

Optionally, in S3051 and S3052, that the UE sends the random access message to the network device may specifically include: sending, by the UE, the second random access message to the network device on one first transmission opportunity; or sending, by the UE, the first random access message to the network device on the plurality of first transmission opportunities, where the plurality of first transmission opportunities include P first PRACH transmission opportunities and Q first PUSCH transmission opportunities, and P and Q are positive integers greater than or equal to 1. P and Q may be preconfigured, and may be any value. The P first PRACH transmission opportunities are P PRACH transmission opportunities that are consecutive in frequency or time and that are associated with a same downlink signal. The Q first PUSCH transmission opportunities are determined based on one or more of the configured PUSCH payload, the measurement result of the downlink signal, or an association relationship with a first PRACH transmission opportunity. If the measurement result of the downlink signal is less than the downlink signal measurement threshold or the configured PUSCH threshold is greater than the to-be-sent PUSCH payload, or is M time units and N frequency domain units offset to a reference position of the first PRACH transmission opportunity, then the Q first PUSCH transmission opportunities are Q PUSCH transmission opportunities that are consecutive in frequency or time and that are associated with a same downlink signal or a same PRACH transmission opportunity. The time unit may be an OFDM symbol, a slot slot, a subframe subframe, or the like. The frequency domain unit may be a subcarrier, a resource block, a resource block group, or the like. M or N may be a value directly configured by a network, or may be indirectly determined based on a multiplexing type that is of a PRACH and a PUSCH in time-frequency domain and that is configured by the network. The Q transmission opportunities that are consecutive in frequency or time may also be referred to as Q parts included in one transmission opportunity, and each part may be a time unit, a frequency unit, or a time-frequency resource.

It should be understood that the foregoing method may also be expressed as follows: if the UE determines that a type of the random access message is the second random access message, in other words, only the preamble is included, the UE sends the random access message only once on one transmission opportunity, and starts random access, or if the UE determines that a type of the random access message is the first random access message, in other words, the preamble and PUSCH need to be transmitted, the UE may send different contents of the random access message on a plurality of transmission opportunities, where the plurality of transmission opportunities are a combination of P PRACHs and Q PUSCHs, and the Q PUSCHs may be referred to as one PUSCH including Q parts.

P is preset in a protocol, for example, P=2. A position relationship between the P PRACHs may be predetermined in a protocol, for example, P RACH opportunities that are consecutive in frequency or time and that correspond to a same downlink signal.

Q may also be preset in the protocol, for example, Q=4, or may vary according to a preset rule or based on configuration information of the network device, for example, may be determined based on a measurement result of a downlink signal, a position of the transmission opportunity, or a payload configured by the network device. If the measurement result of the downlink signal is lower than a threshold, a current coverage is poor, and the PUSCH needs to be transmitted repeatedly for four times. In this case, the UE selects four consecutive PUSCH transmission opportunities. When the payload exceeds a threshold, it indicates that a relatively large quantity of transmission resources are required for transmitting a current PUSCH, and the UE selects four consecutive PUSCH transmission opportunities.

Alternatively, P and Q may be 1. It should be understood that P and Q may also be any other values that can meet a sending requirement.

Optionally, the plurality of first transmission opportunities in the foregoing method may be further selected with reference to the second preset rule. For example, the UE does not expect that the first PUSCH or any PUSCH in the Q PUSCHs and another uplink transmission partially overlap in time. If the first PUSCH or any PUSCH in the Q PUSCHs and another uplink transmission partially overlap in time, the PUSCH may be preferentially transmitted and another uplink transmission may be discarded. Alternatively, the UE does not expect that a PUSCH of the Q PUSCHs other than the first PUSCH and another uplink transmission partially overlap in time. If a PUSCH of the Q PUSCHs other than the first PUSCH and another uplink transmission partially overlap in time, another uplink transmission may be preferentially transmitted, and the PUSCH other than the first PUSCH may be discarded, or a part of the PUSCH that is not the first PUSCH and that conflicts with another uplink transmission may be discarded. Alternatively, the UE does not expect that a period from a start to an end of a plurality of PUSCHs in which the Q PUSCHs are located and another uplink transmission partially overlap in time, or a time difference satisfies a function relation. If this is the case, then the UE may discard the another uplink transmission, or determine that a current transmission opportunity cannot be used as a transmission opportunity for actually sending the random access message, and the UE does not send the random access message on the transmission opportunity.

It should be noted that a purpose of transmitting the random access message on the plurality of transmission opportunities is to increase an initial access success rate. However, in description, a plurality of transmission opportunities that meet a preset rule may be defined as one transmission opportunity. In this case, a content of the random access message, namely, a preamble and/or a PUSCH, is actually transmitted for a plurality of times, to achieve a same technical effect.

According to the foregoing method, transmission reliability of the first-type random access is improved.

The foregoing describes in detail the method in this application. The following provides an apparatus in this application.

Figure 8:
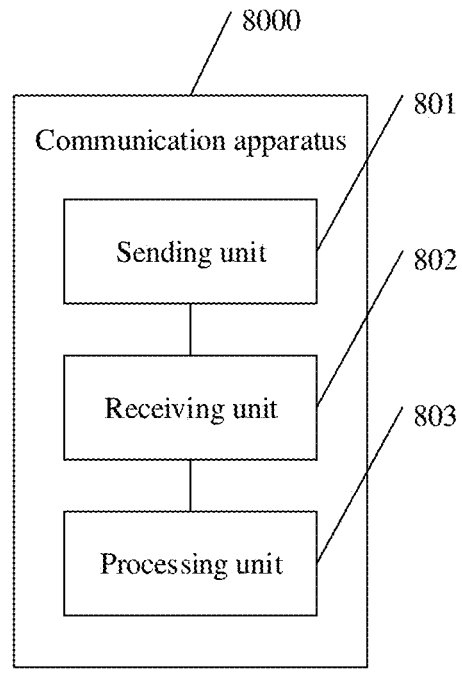
FIG. 8 is an example schematic diagram of modules of a communication apparatus according to this application.

This application further provides a communication apparatus 8000. The communication apparatus 8000 may be applied to the foregoing communication method. FIG. 8 is a schematic diagram of modules of a communication apparatus 8000 according to this application. The communication apparatus 8000 includes a receiving unit 802, configured to receive configuration information sent by a network device; and a processing unit 803, configured to select a first random access message or a second random access message based on the configuration information and a first preset rule. The communication apparatus may specifically be the UE in the foregoing embodiments. The receiving unit 802 and a sending unit 801 may form a transceiver unit.

Figure 9:
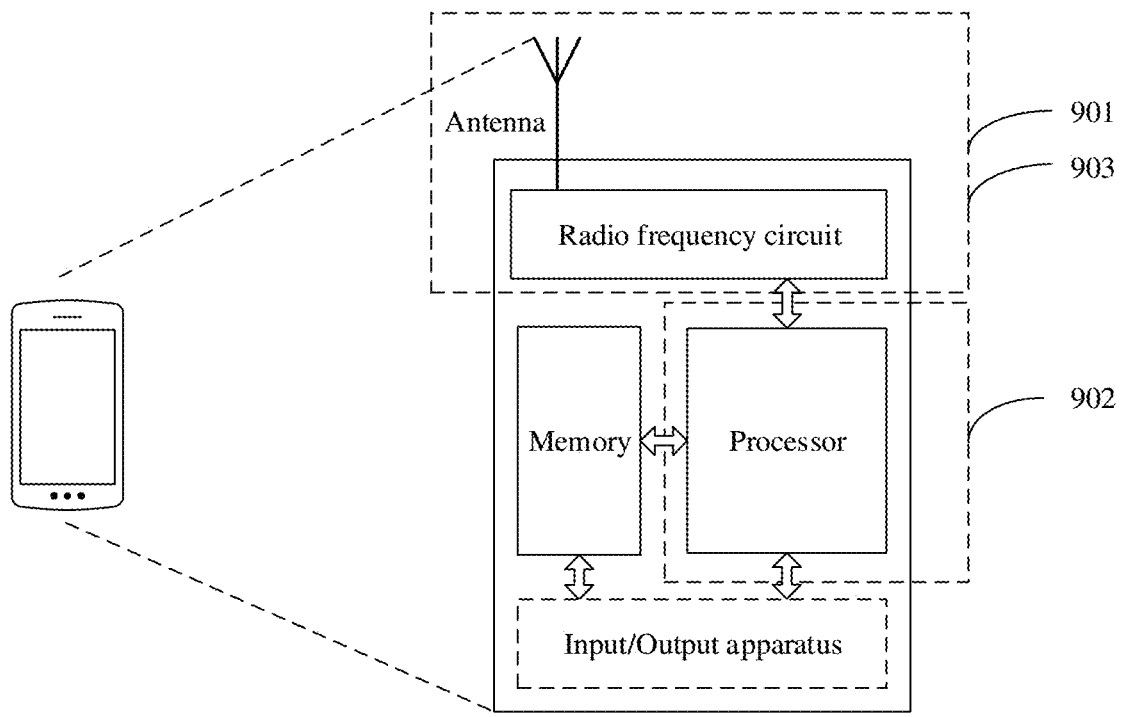
FIG. 9 is a simplified example schematic structural diagram of a terminal device.

In an implementation, FIG. 9 shows a simplified schematic structural diagram of a terminal device. For ease of understanding and convenience of figure illustration, an example in which the terminal device is a mobile phone is used in FIG. 9. As shown in FIG. 9, the terminal device includes a processor, a memory, a radio frequency circuit, an antenna, and an input/output apparatus. The processor is mainly configured to: process a communications protocol and communications data, control the terminal device, execute a software program, process data of the software program, and so on. The memory is mainly configured to store a software program and data. The radio frequency circuit is mainly configured to: perform conversion between a baseband signal and a radio frequency signal, and process the radio frequency signal. The antenna is mainly configured to receive and transmit a radio frequency signal in an electromagnetic wave form. The input/output apparatus such as a touchscreen, a display, or a keyboard is mainly configured to receive data entered by a user and output data to the user. It should be noted that some types of terminal devices may have no input/output apparatus.

When data needs to be sent, the processor performs baseband processing on the to-be-sent data, and outputs a baseband signal to the radio frequency circuit. After performing radio frequency processing on the baseband signal, the radio frequency circuit sends a radio frequency signal in an electromagnetic wave form by using the antenna. When data is sent to the terminal device, the radio frequency circuit receives a radio frequency signal through the antenna, converts the radio frequency signal into a baseband signal, and outputs the baseband signal to the processor; and the processor converts the baseband signal into data, and processes the data. For ease of description, FIG. 9 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have receiving and sending functions may be considered as a receiving unit 901 and a sending unit 903 (which may also be collectively referred to as a transceiver unit) of the terminal device, and the processor having a processing function may be considered as a processing unit 902 of the terminal device. As shown in FIG. 9, the terminal device includes a receiving unit 901, a processing unit 902, and a sending unit 903. The receiving unit 901 may also be referred to as a receiver, a receiving device, a receiving circuit, and the like. The sending unit 903 may also be referred to as a sender, a transmitter, a transmitting device, a transmitting circuit, and the like. 901 and 903 may be referred to as a transceiver unit or a transceiver, and the processing unit may also be referred to as a processor, a processing board, a processing module, a processing apparatus, or the like.

For example, the sending unit 903 is configured to perform S3051 and/or S3052 shown in FIG. 3; the receiving unit 901 is configured to perform S301 shown in FIG. 3; and the processing unit 902 is configured to perform S302. S303, and S304 shown in FIG. 3.

In another implementation, all or some functions of the communication apparatus may be implemented by using a system-on-chip (SoC) technology, for example, implemented by one chip. The chip integrates a kernel, an input/output interface, and the like. The input/output interface may implement functions of the sending unit and the receiving unit, for example, sending a random access request in a form of a baseband signal and receiving a random access response in a form of a baseband signal. The kernel may implement a function of the processing unit, for example, performing a state transition AND/OR operation corresponding to a message format of the random access response. The functions of the kernel and the input/output interface may be implemented by hardware, or may be implemented by hardware executing corresponding software. The hardware or the software includes one or more modules corresponding to the foregoing function. In another embodiment, the input/output interface may also be an interface that is of the chip and that is connected to a circuit, a component, or a device other than the chip, and is configured to output a random access request generated by the chip to the circuit, the component, or the device connected to the chip, or receive a random access response provided by the circuit, the component, or the device connected to the terminal.

Figure 10:
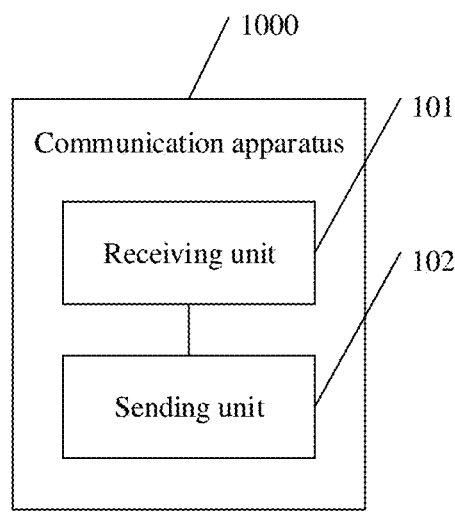
FIG. 10 is an example schematic diagram of modules of another communication apparatus according to this application.

This application further provides a communication apparatus 1000. The communication apparatus 1000 may be applied to the foregoing communication method. FIG. 10 is a schematic diagram of modules of another communication apparatus 1000 according to this application. The communication apparatus 1000 includes a receiving unit 101, configured to receive a random access message sent by a terminal device; and a sending unit 102, configured to send configuration information to the terminal device.

Figure 11:
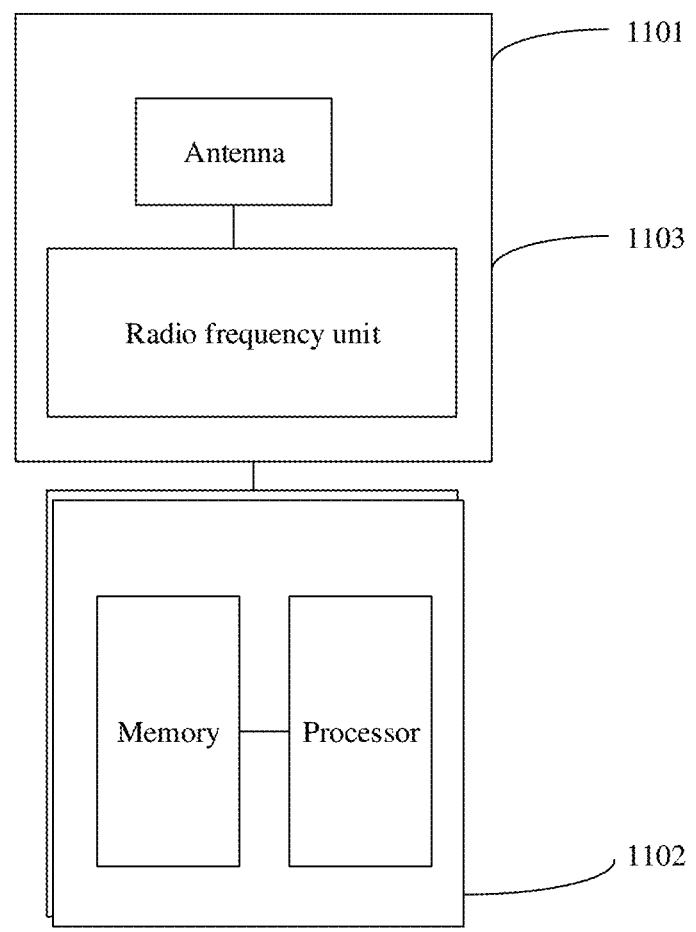
FIG. 11 is a simplified example schematic structural diagram of a network device.

In an implementation, FIG. 11 shows a simplified schematic structural diagram of a network device. The network device includes processing unit part 1102 and a part for radio frequency signal receiving/sending and conversion. The part for radio frequency signal receiving and sending and conversion further includes a receiving unit part 1101 and a sending unit part 1103 (which may also be collectively referred to as a transceiver unit). The part for radio frequency signal receiving/sending and conversion is mainly configured to: send/receive a radio frequency signal and perform conversion between a radio frequency signal and a baseband signal. The processing unit part 1102 is mainly configured to perform baseband processing, control the network device, and the like. The receiving unit 1101 may also be referred to as a receiver, a receiving device, a receiving circuit, and the like. The sending unit 1103 may also be referred to as a sender, a transmitter, a transmitting device, a transmitting circuit, and the like. The receiving unit and the sending unit may be collectively referred to as a transceiver unit or a transceiver. The processing unit part 1102 is usually a control center of the network device, and may be usually referred to as a processing unit, and is configured to control the network device to perform the foregoing method. For details, refer to descriptions in the foregoing related parts.

The processing unit part 1102 may include one or more boards. Each board may include one or more processors and one or more memories. The processor is configured to read and execute a program in the memory to implement a baseband processing function and control the network device. If there are a plurality of boards, the boards may be interconnected to enhance a processing capability. In an optional implementation, alternatively, the plurality of boards may share one or more processors, or the plurality of boards share one or more memories, or the plurality of boards simultaneously share one or more processors.

For example, the receiving unit 1101 is configured to perform S306 in FIG. 3, the sending unit 1103 is configured to perform S300 in FIG. 3, and the processing unit 1102 is configured to perform the step in S299 and/or the step in S307 in FIG. 3.

In another implementation, all or some functions of the communication apparatus may be implemented by using an SoC technology, for example, implemented by using one chip. The chip integrates a kernel, an input/output interface, and the like. The input/output interface may implement functions of the sending unit and the receiving unit, for example, receiving a random access request in a form of a baseband signal and sending a random access response in a form of a baseband signal. The kernel may implement a processing function. The functions of the kernel and the input/output interface may be implemented by hardware, or may be implemented by hardware executing corresponding software. The hardware or the software includes one or more modules corresponding to the foregoing function. In another embodiment, the input/output interface may also be an interface that is of the chip and that is connected to a circuit, a component, or a device other than the chip, and is configured to output a random access request generated by the chip to the circuit, the component, or the device connected to the chip, or receive a random access response provided by the circuit, the component, or the device connected to the terminal.

A person of ordinary skill in the art may be aware that units and algorithm steps in the examples described with reference to the embodiments disclosed in this specification may be implemented by electronic hardware or a combination of computer software and electronic hardware. Whether the functions are performed by hardware or software depends on a particular application and an implementation constraint condition of the technical solutions. A person skilled in the art may use different methods to implement the described functions for each particular application, but it should not be considered that the implementation goes beyond the scope of this application.

It may be clearly understood by a person skilled in the art that, for convenient and brief description, for a detailed working process of the foregoing system, apparatus, and unit, refer to a corresponding process in the foregoing method embodiment.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

In addition, function units in the embodiments of this application may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, all or some of the embodiments may be implemented in a form of computer program product. The computer program product includes one or more computer instructions. When the computer program instructions are loaded and executed on a computer, the procedure or functions according to this application are all or partially generated. The computer may be a general-purpose computer, a special-purpose computer, a computer network, or another programmable apparatus. The computer instruction may be stored in a computer-readable storage medium, or may be transmitted by using the computer-readable storage medium. The computer instruction may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (solid state disk, SSD)), or the like.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium includes: any medium that can store program code, such as a read-only memory (ROM), a random access memory (RAM), a magnetic disk, or an optical disc.

What is claimed is:

1. A communication method, comprising:
    receiving, by user equipment (UE), configuration information sent by a network device; and
    selecting, by the UE, a first random access message or a second random access message based on the configuration information and a first preset rule, wherein
    the first random access message includes a preamble and a physical uplink shared channel (PUSCH),
    the second random access message includes the preamble but does not include the PUSCH, and
    when the PUSCH of the first random access message and an uplink transmission at least partially overlap in time, or an interval between the PUSCH of the first random access message and the uplink transmission is less than N time units, the PUSCH of the first random access message is not sent.

2. The communication method according to claim 1, wherein after receiving the configuration information sent by the network device, the method further comprises:
    selecting, by the UE, one or more first transmission opportunities based on the configuration information, wherein
    a first transmission opportunity, from the one or more first transmission opportunities, comprises a first physical random access channel (PRACH) transmission opportunity and/or a first PUSCH transmission opportunity.

3. The communication method according to claim 2, wherein after selecting the one or more first transmission opportunities based on the configuration information, the method further comprises:

selecting, by the UE, one or more second transmission opportunities from the one or more first transmission opportunities based on the configuration information and a second preset rule, wherein a second transmission opportunity, from the one or more second transmission opportunities, comprises a second PRACH transmission opportunity and/or a second PUSCH transmission opportunity.

4. The method according to claim 1, wherein the configuration information comprises one or more of:

an indication information indicator, a downlink signal measurement threshold, a configured PUSCH threshold payload, a time difference threshold, a measurement gap position, and one or more association parameters between a downlink signal and a transmission opportunity.

5. The method according to claim 1, wherein the first preset rule or the second preset rule comprises one or more of:

a relationship between a measurement result of a downlink signal and a downlink signal measurement threshold, a relationship between a to-be-sent PUSCH payload and a configured PUSCH payload, a time sequence of transmission opportunities, a relationship between a transmission opportunity and a measurement gap position, and a priority relationship between a transmission opportunity and another uplink signal.

6. The method according to claim 1, wherein the configuration information comprises a first downlink signal measurement threshold, a second downlink signal measurement threshold, and the one or more association parameters between a downlink signal and a transmission opportunity, wherein the first downlink signal measurement threshold is less than the second downlink signal measurement threshold; and before selecting the first random access message or the second random access message based on the configuration information and the first preset rule, the method further comprises:

obtaining, by the UE, a measurement result of one or more downlink signals.

7. The method according to claim 6, wherein the first preset rule comprises:

if a measurement result of at least one downlink signal is greater than or equal to the second downlink signal measurement threshold, the first random access message is selected; or if a measurement result of any downlink signal is less than the first downlink signal measurement threshold, the second random access message is selected.

8. An apparatus, comprising:

a transceiver configured to receive configuration information sent by a network device; and a processor configured to select a first random access message or a second random access message based on the configuration information and a first preset rule, wherein the first random access message includes a preamble and a physical uplink shared channel (PUSCH), the second random access message includes the preamble but does not include the PUSCH, and when the PUSCH of the first random access message and an uplink transmission at least partially overlap in time, or an interval between the PUSCH of the first random access message and the uplink transmission is less than N time units, the PUSCH of the first random access message is not sent.

9. The apparatus according to claim 8, wherein the processor is further configured to:

select one or more first transmission opportunities based on the configuration information, wherein a first transmission opportunity, from the one or more first transmission opportunities, comprises a first physical random access channel (PRACH) transmission opportunity and/or a first PUSCH transmission opportunity.

10. The apparatus according to claim 9, wherein the processor is further configured to:

select one or more second transmission opportunities from the one or more first transmission opportunities based on the configuration information and a second preset rule, wherein a second transmission opportunity, from the one or more second transmission opportunities, comprises a second PRACH transmission opportunity and/or a second PUSCH transmission opportunity.

11. The apparatus according to claim 8, wherein the configuration information comprises one or more of:

an indication information indicator, a downlink signal measurement threshold, a configured PUSCH threshold payload, a time difference threshold, a measurement gap position, and one or more association parameters between a downlink signal and a transmission opportunity.

12. The apparatus according to claim 8, wherein the first preset rule or the second preset rule comprises one or more of:

a relationship between a downlink signal measurement result and a downlink signal measurement threshold, a relationship between a to-be-sent PUSCH payload and a configured PUSCH payload, a time sequence of transmission opportunities, a relationship between a transmission opportunity and a measurement gap position, and a priority relationship between a transmission opportunity and another uplink signal.

13. The apparatus according to claim 8, wherein the configuration information comprises a first downlink signal measurement threshold, a second downlink signal measurement threshold, and the one or more association parameters between a downlink signal and a transmission opportunity, wherein the first downlink signal measurement threshold is less than the second downlink signal measurement threshold; and the processor is further configured to obtain a measurement result of one or more downlink signals.

14. The apparatus according to claim 13, wherein the first preset rule comprises:

if a measurement result of at least one downlink signal is greater than or equal to the second downlink signal measurement threshold, the processor selects the first random access message; or if a measurement result of any downlink signal is less than the first downlink signal measurement threshold, the processor selects the second random access message.

15. An apparatus, comprising:

a transceiver configured to send configuration information to user equipment (UE); wherein the transceiver is further configured to detect a random access message sent by the UE;

the random access message is a first random access message or a second random access message, the first random access message includes a preamble and a physical uplink shared channel (PUSCH), and the second random access message includes the preamble but does not include the PUSCH; and the configuration information comprises one or more of: an indication information indicator, a configured PUSCH threshold payload, a time difference threshold, a measurement gap position, and one or more association parameters between a downlink signal and a transmission opportunity.

16. The apparatus according to claim 15, wherein
a downlink signal measurement threshold comprises a first downlink signal measurement threshold and a second downlink signal measurement threshold; or
the one or more association parameters between the downlink signal and the transmission opportunity comprise an association parameter between the downlink signal and a first-type random access transmission opportunity, and an association parameter between the downlink signal and a second-type random access transmission opportunity; and in first-type random access, the UE sends the first random access message; or in second-type random access, the UE sends the second random access message.

17. The apparatus according to claim 15, wherein
a transmission opportunity indicated by the one or more association parameters between the downlink signal and the transmission opportunity does not conflict with another uplink transmission or the measurement gap position; or
if a conflict occurs between the transmission opportunity indicated by the one or more association parameters between the downlink signal and the transmission opportunity and another uplink transmission or the measurement gap, a transmission opportunity that is N time units behind the transmission opportunity is selected as the transmission opportunity; and
the transmission opportunity indicated by the one or more association parameters between the downlink signal and the transmission opportunity comprises a physical random access channel (PRACH) transmission opportunity and a PUSCH transmission opportunity;
the conflict comprises that the transmission opportunity and the another uplink transmission at least partially overlap in time, or an interval is less than M time units; and
M and N are greater than 0.

18. The apparatus according to claim 15, wherein
a transmission opportunity indicated by the one or more association parameters between the downlink signal and the transmission opportunity does not conflict with another uplink transmission or the measurement gap position; or
if a conflict occurs between the transmission opportunity indicated by the one or more association parameters between the downlink signal and the transmission opportunity and another uplink transmission or the measurement gap, a transmission opportunity that is N time units behind the transmission opportunity is selected as the transmission opportunity; and
the transmission opportunity indicated by the one or more association parameters between the downlink signal and the transmission opportunity comprises a physical random access channel (PRACH) transmission opportunity and a PUSCH transmission opportunity;
the conflict comprises that the transmission opportunity and the another uplink transmission at least partially overlap in time, or an interval is less than M time units; and
M and N are greater than 0.

19. A non-transitory computer readable storage medium having computer readable instructions that, when executed by a computer, cause the computer to provide execution comprising:
receiving configuration information sent by a network device; and
selecting a first random access message or a second random access message based on the configuration information and a first preset rule, wherein
the first random access message includes a preamble and a physical uplink shared channel (PUSCH),
the second random access message includes the preamble but does not include the PUSCH, and
when the PUSCH of the first random access message and an uplink transmission at least partially overlap in time, or an interval between the PUSCH of the first random access message and the uplink transmission is less than N time units, the PUSCH of the first random access message is not sent.

20. The communication method according to claim 1, wherein
the first random access message is of a first-type random access, and
the second random access message is of a second-type random access.

* * * * *